(12) United States Patent
Bing

(10) Patent No.: US 8,527,398 B2
(45) Date of Patent: Sep. 3, 2013

(54) METHOD AND SYSTEM FOR PREDICTING SOLAR ENERGY PRODUCTION

(75) Inventor: James M. Bing, Concord, MA (US)

(73) Assignee: NEO Virtus Engineering, Inc., Littleton, MA (US)

( * ) Notice: Subject to any disclaimer, the term of this patent is extended or adjusted under 35 U.S.C. 154(b) by 0 days.

(21) Appl. No.: 13/619,627

(22) Filed: Sep. 14, 2012

(65) Prior Publication Data

US 2013/0013486 A1    Jan. 10, 2013

Related U.S. Application Data

(62) Division of application No. 12/459,455, filed on Jul. 1, 2009, now Pat. No. 8,280,799, which is a division of application No. 10/922,253, filed on Aug. 19, 2004, now Pat. No. 7,580,817.

(60) Provisional application No. 60/523,074, filed on Nov. 18, 2003, provisional application No. 60/507,899, filed on Oct. 1, 2003, provisional application No. 60/496,411, filed on Aug. 20, 2003.

(51) Int. Cl.
*G06Q 40/00*    (2012.01)

(52) U.S. Cl.
USPC ............................. 705/37; 705/35; 705/36 R

(58) Field of Classification Search
USPC ................. 703/3; 705/37, 36 R, 35
See application file for complete search history.

(56) References Cited

U.S. PATENT DOCUMENTS

| | | | |
|---|---|---|---|
| 6,037,758 A | 3/2000 | Perez | |
| 6,185,483 B1 | 2/2001 | Drees | |
| 6,285,989 B1 | 9/2001 | Shoham | |
| 6,512,966 B2 | 1/2003 | Lof et al. | |
| 6,542,791 B1 | 4/2003 | Perez | |
| 6,583,521 B1 | 6/2003 | Lagod et al. | |
| 6,889,122 B2 | 5/2005 | Perez | |
| 7,085,739 B1* | 8/2006 | Winter et al. | 705/37 |
| 7,430,534 B2* | 9/2008 | Lof et al. | 705/37 |
| 2002/0040356 A1 | 4/2002 | Gluck et al. | |
| 2002/0165816 A1 | 11/2002 | Barz | |
| 2003/0009401 A1 | 1/2003 | Ellis | |
| 2003/0040847 A1 | 2/2003 | Tsui | |
| 2003/0041002 A1 | 2/2003 | Hao et al. | |
| 2003/0055664 A1 | 3/2003 | Suri | |
| 2003/0055776 A1 | 3/2003 | Samuelson | |
| 2004/0215545 A1* | 10/2004 | Murakami et al. | 705/36 |

FOREIGN PATENT DOCUMENTS

JP    10-108486    4/1998

* cited by examiner

*Primary Examiner* — James A Vezeris
(74) *Attorney, Agent, or Firm* — Hamilton, Brook, Smith & Reynolds, P.C.

(57) ABSTRACT

A method for hedging energy sales or purchases in a short-term future or day-ahead market includes determining an historical performance of a regional net energy forecasting methodology for a facility or facilities which have solar energy generating systems in a geographical region. The method further includes estimating a difference between the maximum cost of energy in a spot market and an energy trader's minimum price of energy for each hour bid in the short-term future or day-ahead market, determining a risk factor associated with energy sales or purchases from the historical performance and the estimated difference, and purchasing or selling options to buy energy at the previous day's day-ahead market price based on the determined risk factor.

2 Claims, 12 Drawing Sheets

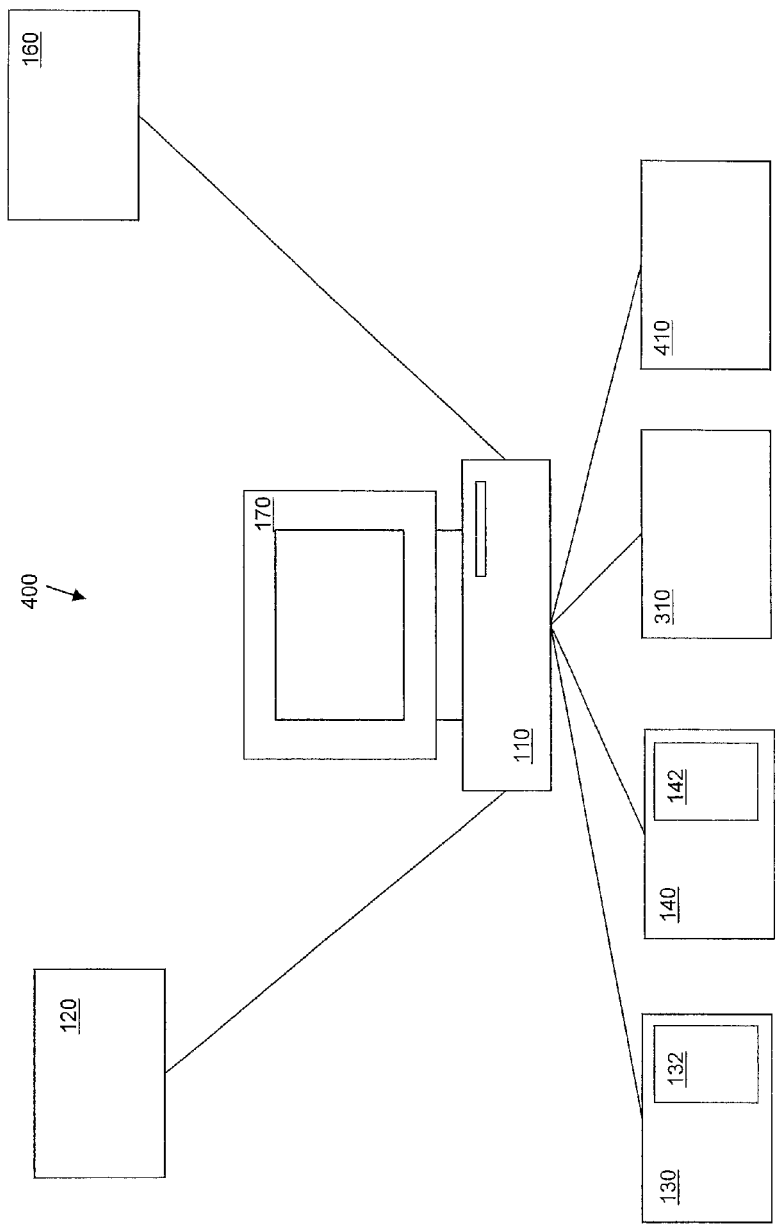

METHOD AND SYSTEM FOR PREDICTING SOLAR ENERGY PRODUCTION

RELATED APPLICATIONS

This application is a divisional application of U.S. application Ser. No. 12/459,455, filed Jul. 1, 2009 now U.S. Pat. No. 8,280,799 which is a divisional application of U.S. application Ser. No. 10/922,253, filed Aug. 19, 2004 now U.S. Pat. No. 7,580,817 which claims the benefit of U.S. Provisional Application No. 60/523,074, filed on Nov. 18, 2003; U.S. Provisional Application No. 60/507,899, filed on Oct. 1, 2003; and U.S. Provisional Application No. 60/496,411, filed on Aug. 20, 2003, the entire teachings of which are incorporated herein by reference.

BACKGROUND OF THE INVENTION

Since the first practical demonstration of photovoltaic (PV) cells, devices used to convert sunlight directly into electrical energy, was performed in 1954, people have sought to employ the technology for terrestrial energy production on an ever-increasing scale. To enable this and other solar technologies, such as solar thermal and solar thermal-electric systems, to perform optimally, evaluation methods and processes have been developed by scientists and researchers to map the relative concentration of solar radiation hitting the earth's surface in different geographic locations. This process of mapping the sun's intensity is generally referred to as solar resource assessment. Traditional solar resource assessment can, in many ways, be likened to prospecting, albeit with the use of sophisticated instruments and highly rigorous scientific methods and practices. Some of the products of this assessment process are databases that catalog the regional intensity of the solar resource, on an hourly basis, over the course of many years. These databases are often displayed as maps with topographic-like demarcation and shadings corresponding to the intensity of the average annual solar resource. Because the solar radiation hitting the earth's surface is highly dependant upon the local meteorological conditions it can vary from one day, week, month or year to the next. Therefore, the databases usually contain time periods large enough (perhaps as much as thirty years) to smooth the year-to-year variation and approximate the characteristic annual climate conditions of the site being assessed. A single representative year of assessment data for a site can be synthesized from an average of a larger multi-year database. One method used to create such a representative year is to select the most "typical" individual months from a database of thirty years, and combine them to form a typical meteorological year (TMY). The resulting one-year database of irradiance and weather data is predictive of the conditions that can be expected for a site over a period similar to the original sampling period of thirty years.

Once these solar resource databases are compiled they can be used as inputs into software programs that simulate electrical energy production from solar generating systems. These simulation programs use the solar resource data for a given location, in combination with the physical parameters of a particular solar generating system, —such as system size, orientation angles, equipment types, electrical characteristics, shading obstructions, latitude, longitude, elevation, and other features, needed to characterize the solar generator—to estimate the useful energy that can be expected from the system over the course of a period of time comparable to the original data-sampling period. Using such a process, it is possible to estimate the useful energy that would be produced by a solar generating system over its thirty-year lifetime.

Presently, solar energy contributes only a tiny fraction of the electrical energy consumed within the electrical grid. In its present form, the electrical grid, both in its physical structure and in its market configuration, is not designed to incorporate a significant percentage of its daily energy transactions from solar energy. Because, with present technology, large amounts of electrical energy cannot be stored cost effectively, the grid requires constant management to balance production with demand. Electricity is a product that must be used as soon as it is produced. Because it is so essential and critical to our society, reliability standards are extremely high, often referred to as being in the "high nines." This standard indicates that it is expected that service will be present and within specifications 99.999% of the time. For the engineers who must manage the dispatch of generation, the reserves and the transmission constraints of the grid, grid-tied solar energy presents no problem as long as its contribution is a small percentage of the energy flowing through the system. For traders in deregulated wholesale energy markets who resell energy to end users, and who must anticipate their customer's demand, solar energy generation that is distributed amongst those customers, presents no problem, again, so long as that generation makes up only a small percentage of the total demand.

SUMMARY OF THE INVENTION

The economics of electrical energy are changing, and as the cost of energy created from solar generation systems approaches that of traditional generation technologies, solar energy will become more prevalent on the utility grid. Solar irradiance is, on average, on an annual basis, periodic and predictable. However, on an hourly basis, on the earth's surface, solar energy is fundamentally intermittent and, generally not considered to be predictable. If solar energy generation systems rise to meet a significant fraction of the daytime energy demand of the electrical grid, whether on the customer's side or on the supply side of the revenue meter, they will present a serious management challenge to the stability, security, and reliability of the grid unless their production can be accurately predicted on the same hourly basis as that used to dispatch traditional generating resources. These same considerations apply to energy markets. If solar energy generation systems become a major contributor to the total energy mix within an operating territory, they would also be potentially disruptive to the associated wholesale electrical energy market, unless their contribution can be accurately predicted on an hourly basis. Embodiments of the present invention can be used to predict hourly solar energy system production in the next hour, or up to the next week.

Traditional solar resource assessment methods collect long-term irradiance data associated with particular geographic sites, either by direct measurement or by modeling from meteorological observations. The raw data sets may span decades. These historical data are distilled into a single representative year for each geographic site. The distilled, site specific, single year, "average" or "typical," data sets can then be used as inputs to solar generator simulation programs. This process estimates the yearly electrical energy production that the specific simulated system would yield, were it to run over a timeframe comparable to the original data collection time. The problem with using this process as an estimating method is that the long-term, historical data set is static. Every time a simulation is conducted, based upon a location's historical meteorological and irradiance profile, in combination with the unique characteristics of a specific solar generator system, a single solution—a one-year prediction of hourly electrical energy production—will result. The simulation will always produce the same solution for a specific system, at a specific site. The solution represents a long-term average, of sorts, for the geographic location and solar generator being simulated or modeled.

Embodiments of the present invention can use a prospective data set, rather than a static retrospective data set. Further, in accordance with the present invention, a unique solution can be attained with every iteration of the simulation (unless two one-week, hourly forecasts result in exactly identical meteorological and irradiance conditions for the entire forecast period) by using forecast meteorological data to predict a location's immediate short-term future irradiance profile. Furthermore, embodiments of the present invention can achieve week-ahead and hour-ahead hourly regional predictions of solar energy production by combining state of the art one-week weather forecasting, irradiance modeling technology, and solar energy generation simulation techniques. With this approach an electricity grid can function with a significant proportion of its generation capacity supplied by solar energy systems distributed throughout its network. Another aspect of the invention provides an enhancement to the forecasting tools grid operators currently use to anticipate their load. Another aspect provides a method for energy traders to anticipate their near-term contractual obligations and to adjust their position in the market. In addition, new tradable energy products can be defined that provide a mechanism to manage the financial risk associated with the inherent intermittency of solar energy.

Accordingly, there is provided a method of forecasting energy production for solar generating systems in a region by collecting meteorological data for a given area of the region, estimating irradiance levels using parameters collected from the meteorological data, and simulating solar energy production using the collected meteorological data, estimated irradiance levels, and physical characteristics of a solar generating system in the given area of the region. The parameters can include global horizontal (GH) irradiance, diffuse horizontal (DH) irradiance, and direct normal (DN) irradiance. The meteorological data can be collected on a week-ahead hourly basis. The physical characteristics of the solar generating system can include system size, orientation angles, equipment types, electrical characteristics, shading obstructions, latitude, longitude, and elevation.

The method can be used to forecast the net electrical energy imported or exported by a single facility with a solar generating system, from the simulated solar energy production and the forecasted energy demand for that facility.

The method can be used to forecast the total solar electrical energy production for a set of solar energy generating systems distributed over a region, by aggregating the forecast simulated energy production for each solar generating system distributed over the region. Further, the method can determine a net electrical energy production or consumption for a region with facilities that posses solar generating systems by simulating net energy imported or exported by those facilities, in combination with the electrical energy consumption of facilities in the region that do not posses solar energy generating systems. The method can forecast, on an hourly basis, the incident solar power on a target surface using the collected meteorological data, estimated irradiance levels and physical characteristics of the target surface. The physical characteristics of the target surface can include surface size, orientation angles, shading obstructions, latitude, longitude, and elevation.

The method can determine, for energy traders that have long-term energy contract obligations to serve loads, the short-term demand of their customers; some of which have solar generation capability within their facilities. The method can adjust a trader's short-term energy purchases or sales, whether in a day-ahead, or a spot market. The energy trader can use the process to estimate a net hourly energy production or consumption of customers in the time period defined by the short-term market. Further, the method can insure or hedge energy sales or purchases in a day-ahead market against shortfalls in the spot market. An hourly short-term energy futures market can be defined which consists of options to buy or sell blocks of energy in the real time or spot market, at pre-agreed prices.

BRIEF DESCRIPTION OF DRAWINGS

The foregoing and other objects, features and advantages of the invention will be apparent from the following more particular description of the preferred embodiments of the invention, as illustrated in the accompanying drawings in which like referenced characters refer to the same parts throughout the different views.

FIG. 4A shows a system diagram for predicting the net electrical energy production or consumption for a set of facilities possessing solar generating systems, distributed over a region, one week in advance, on an hourly basis;

DETAILED DESCRIPTION OF THE INVENTION

A description of preferred embodiments of the invention follows.

Figure 1A:
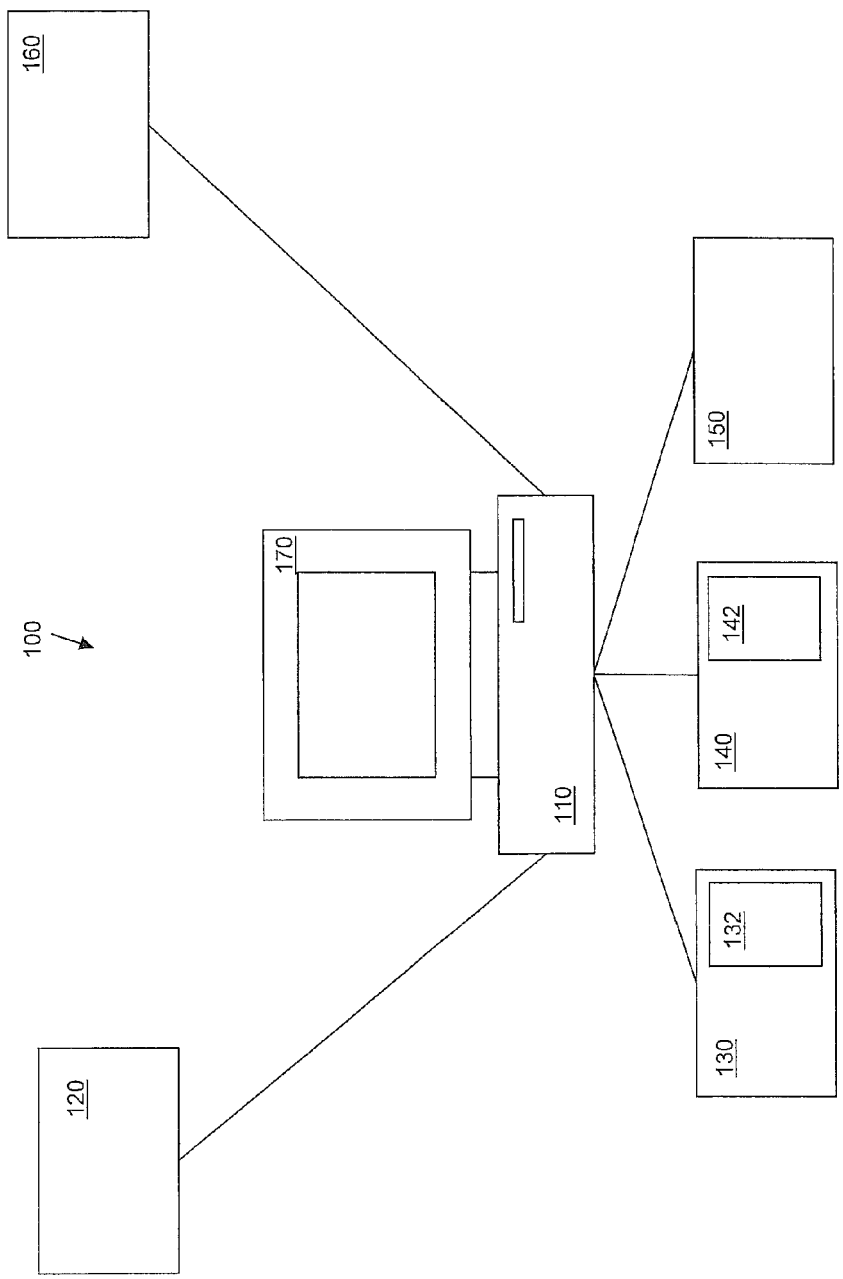
FIG. 1A shows a system diagram for predicting electrical energy production for solar generating systems, one week in advance, on an hourly basis.

In general as shown in FIG. 1A, one embodiment of the present invention provides a system 100 for predicting electrical energy output for a solar electric generating system (solar generator), a week in advance, in one-hour intervals. The solar generating system can be any type of solar generating system known in the art, such as a photovoltaic generation system. The system 100 includes a processor 110, a database 120, a weather data module 130, a solar irradiance data module 140, a solar electric generating system characterization module 150, a connection to an outside weather service provider 160, and an output device 170. The database module 120, the weather data module 130, the solar irradiance data module 140, and the solar electric generating system characterization module 150 described further herein. The connection to an outside weather service provider 160 can be the Internet, direct dial-up or another connections means known in the art. The output device 170 can be a display, printer, or any other output device know in the art.

The weather data module 130 includes a short-term weather forecast module 132 which collects meteorological one-week forecast data for a geographical location of the solar generator from the weather service provider 160 and stores the data in the database 120. The solar irradiance data module 140 includes an estimation module 142 which estimates type and intensity of solar radiation for the site from selected meteorological parameters from the meteorological forecast data and stores the data in the database 120. The solar electric generating system characterization module 150 includes known characteristics of the solar electric generating system and the characteristic data is stored the data in the database 120. The system 100 combines the data from the weather data module 130, the solar irradiance data module 140, and the solar electric generating system characterization module 150 and simulates the energy output for the solar generator. The output is displayed on an output device 170. The output of the system 100 is an hourly estimate, for the week of the original weather forecast, of the electrical energy production of the solar generator being modeled.

Figure 1B:
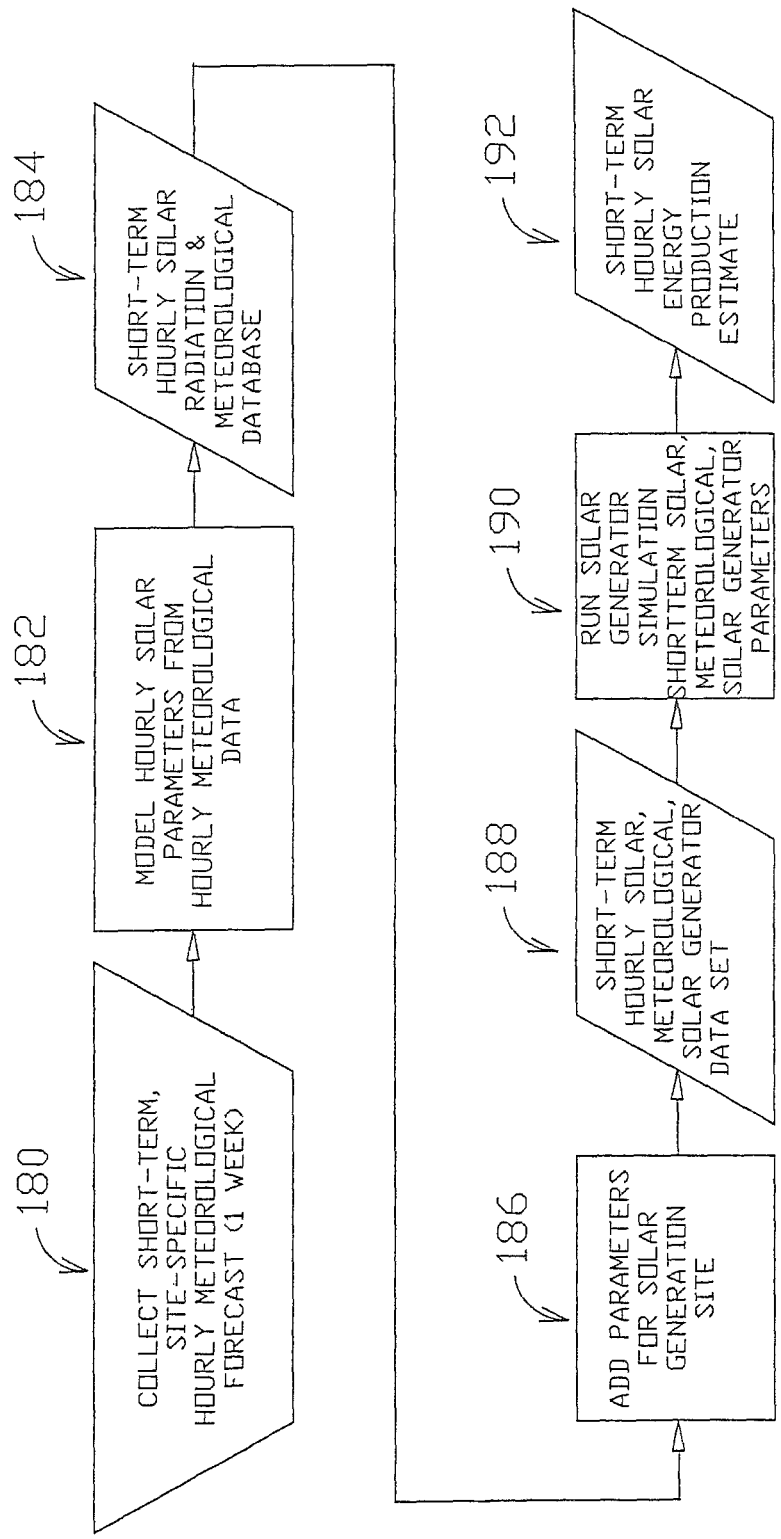
FIG. 1B shows a flow-diagram of the process of FIG. 1A.

FIG. 1B shows a flow diagram of the process of FIG. 1A for predicting electrical energy production by a solar electric generating system, on an hourly basis, one week in advance. The process can be implemented through the following steps:

1. Collect one-week weather forecast data 180 for a geographic region of interest from a weather service provider, such as the National Weather Service or a commercial alternative. Convert the weather forecast data into a format required for use as inputs in an irradiance model 182. The irradiance model 182 can be MRM™ (Meteorological Radiation Model) or any other appropriate irradiance model that produces estimates of solar irradiance parameters. The solar irradiance parameters can include global horizontal (GH), diffuse horizontal (DH), and direct normal (DN) irradiance from the meteorological parameters.
2. Insert the regional forecast meteorological data 180 into the selected irradiance model 182 to estimate irradiance levels, expressed in terms of GH, DH, and DN for the hours and the region in question. Produce a combined database 184 for each hour of the forecast week of irradiance parameters and meteorological data. The combined database 184 is used in a solar generator simulation software program 190, such as PV Design Pro™.
3. Add the physical parameters 186 for the solar generating system. The parameters can include system size, orientation angles, equipment types, electrical characteristics, shading obstructions, latitude, longitude, elevation, and other features. The physical parameters 186 are added to the combined database 184 to create a combined meteorological, irradiance and solar generator database 188 needed to run the solar generator simulation software program 190.
4. Run the simulation program 190 and output the electrical system production for the systems being modeled. This result is a database 192 containing the electrical output for each hour of the forecast period for the system being evaluated.

Figure 2A:
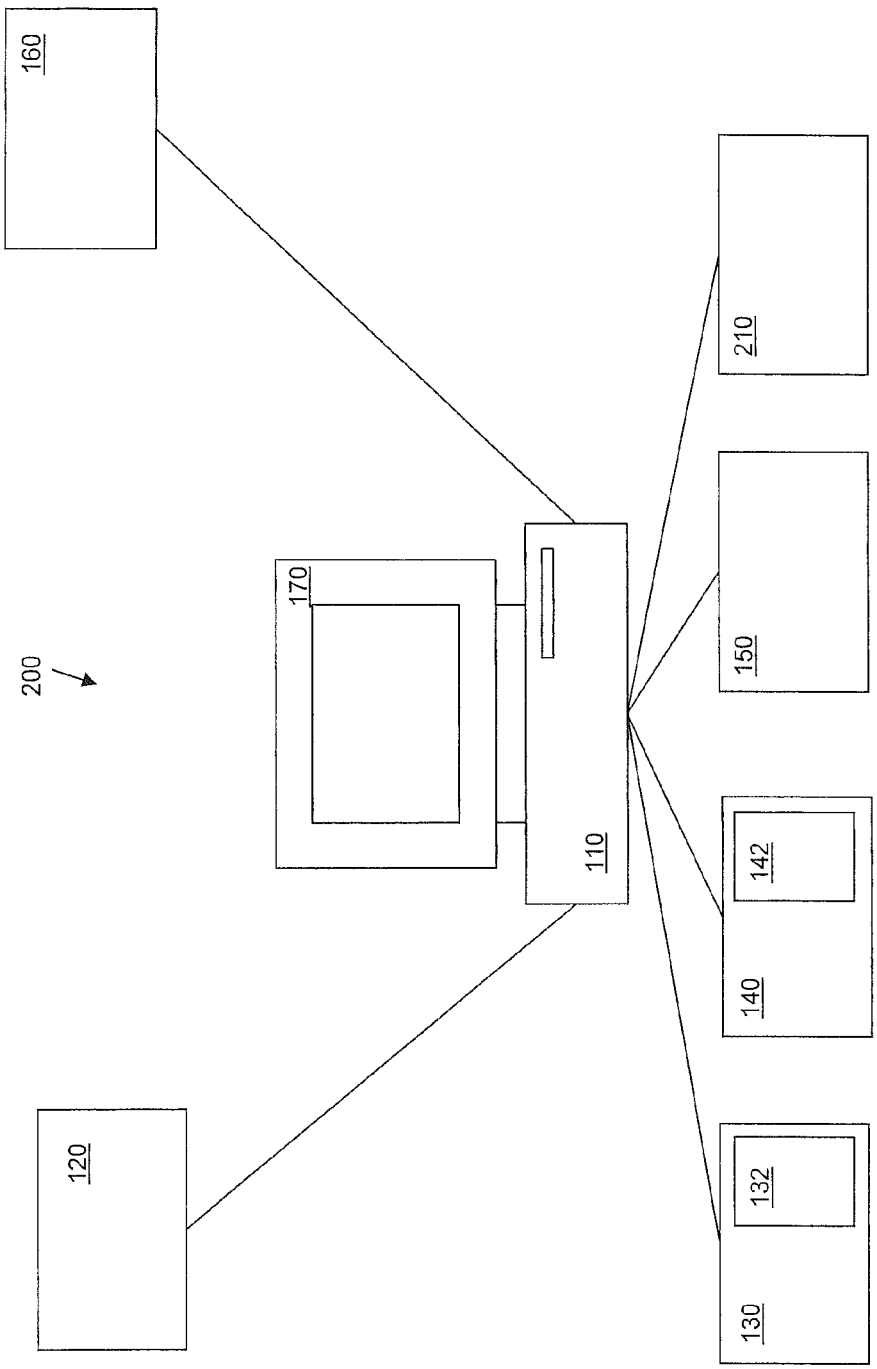
FIG. 2A shows a system diagram for predicting the net electrical energy production or consumption for a single facility possessing a solar generating system, one week in advance, on an hourly basis.

FIG. 2A is another embodiment of the invention which provides a system 200 for predicting the hourly net energy, relative to the point of common connection with an electrical grid, that is either exported to or imported from the electrical grid for solar generating systems that are located within a facility that normally consumes electrical energy from an electrical grid. The system 200 includes the components of system 100 of FIG. 1A and a load forecasting module 210. The load forecasting module 210 models the energy consumption of the facility for the same period as the weather forecast used to predict the hourly solar generation. The hourly forecast load for the facility is then deducted from the hourly forecast energy production. The result is an hourly forecast of the net electrical energy produce or consumed by the facility for the week in question.

Figure 2B:
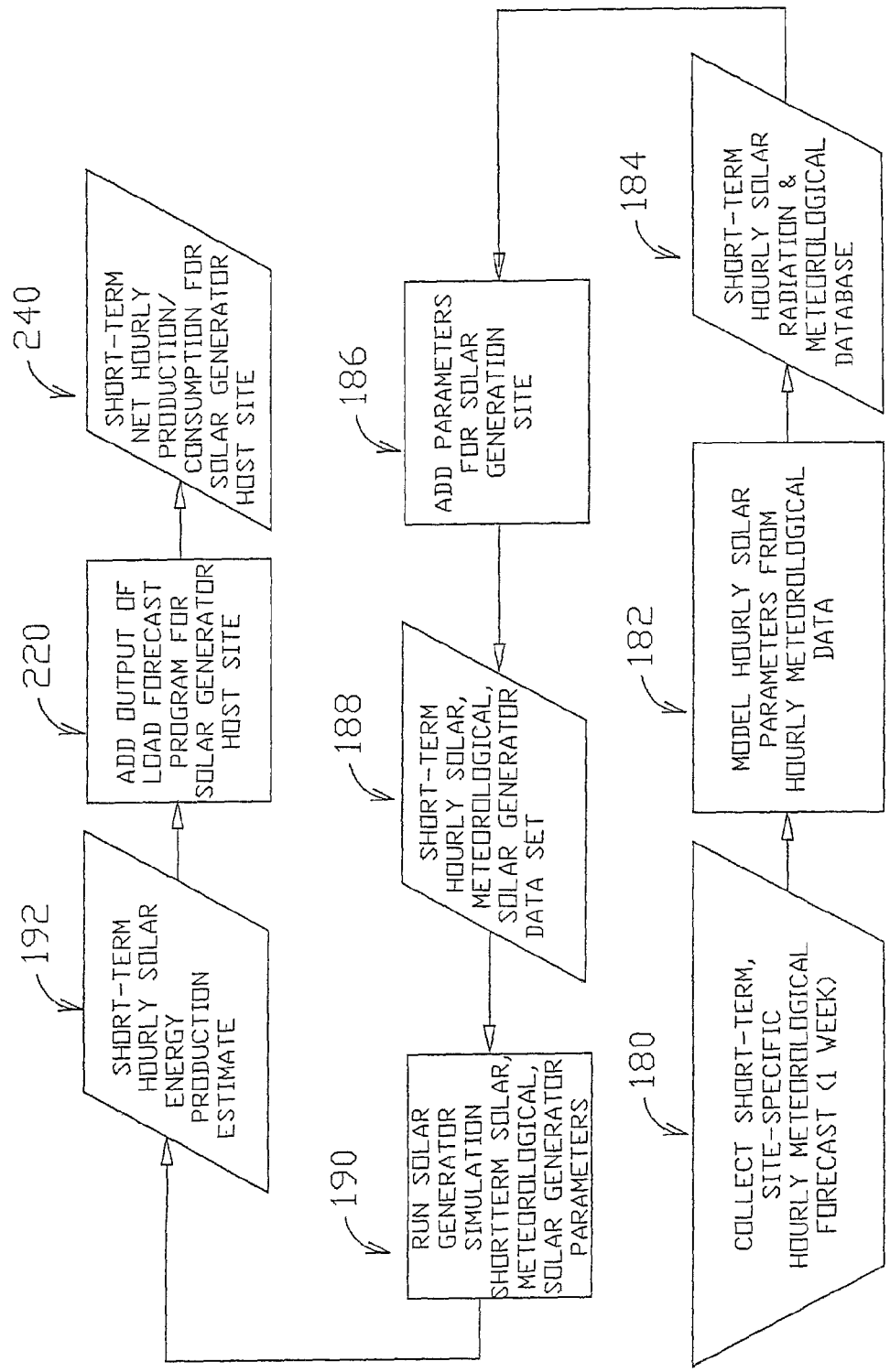
FIG. 2B shows a flow-diagram of the process of FIG. 2A.

FIG. 2B shows a flow diagram of the process of FIG. 2A for predicting on an hourly basis, one week in advance, the net electrical energy imported or exported from an electrical grid, by a facility that has a solar generation system on the load side of the point of common connection with the electrical grid. The process can be implemented through the following steps:

1. Collect one-week weather forecast data 180 for a geographic region of interest from a weather service provider, such as the National Weather Service or a commercial alternative. Convert the weather forecast data into a format required for use as inputs in an irradiance model 182. The irradiance model 182 can be MRM™ (Meteorological Radiation Model) or any other appropriate irradiance model that produces estimates of solar irradiance parameters. The solar irradiance parameters can include global horizontal (GH), diffuse horizontal (DH), and direct normal (DN) irradiance from the meteorological parameters.
2. Insert the regional forecast meteorological data 180 into the selected irradiance model 182 to estimate irradiance levels, expressed in terms of GH, DH, and DN for the hours and the region in question. Produce a combined database 184 for each hour of the forecast week of irradiance parameters and meteorological data. The combined database 184 is used in a solar generator simulation software program 190, such as PV Design Pro™.
3. Add the physical parameters 186 for the solar generating system. The parameters can include system size, orientation angles, equipment types, electrical characteristics, shading obstructions, latitude, longitude, elevation, and other features. The physical parameters 186 are added to the combined database 184 to create a combined meteorological, irradiance and solar generator database 188 needed to run the solar generator simulation software program 190.
4. Run the simulation program 190 and output the electrical system production for the systems being modeled. This result is a database 192 containing the electrical output for each hour of the forecast period for the system being evaluated.
5. Run an energy demand forecasting simulation program, such as CEDMS (Commercial Energy Demand Model System) or REDMS (Residential Energy Demand Model System) for the facility that includes the solar generating system that has just been modeled. These models yield a demand profile for the facility being considered that represents the electricity demand that these customers would present in the absence of any customer-sited generation.
6. Subtract the output of the demand forecasting simulation 220 from the output of the solar generator simulation program 192 to produce a one-week forecast, on an hourly basis 240, of the net electrical energy imported or exported from the grid.

Figure 3A:
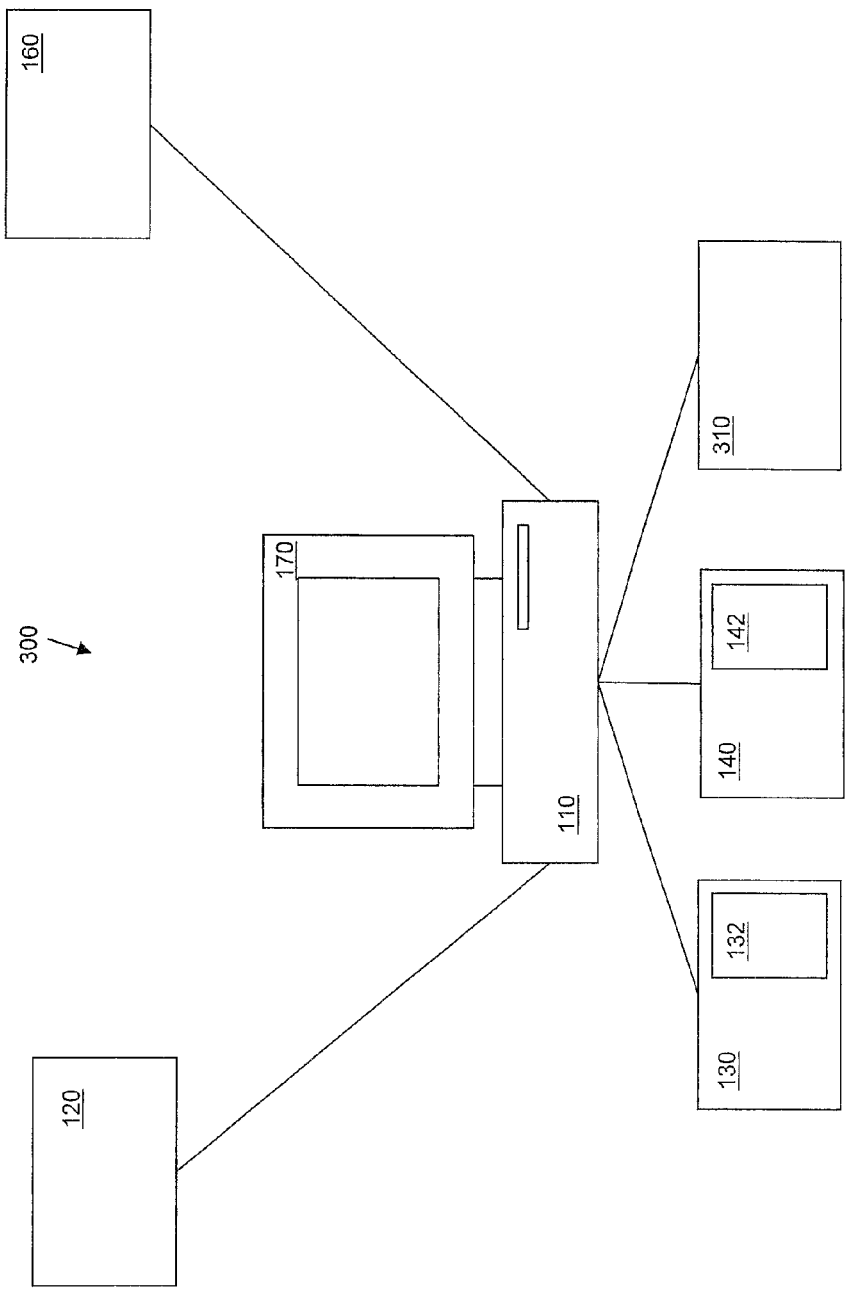
FIG. 3A shows a system diagram for predicting electrical energy production for a set of solar generating systems, distributed over a region, one week in advance, on an hourly basis.

FIG. 3A is another embodiment of the invention which provides a system 300 for predicting the electrical energy output from a set of solar electric generating system distributed over a region. The system 300 includes the components of system 100 of FIG. 1A and a site aggregation module 310. The site aggregation module 310 repeats the process as described in FIG. 1B until all of the solar electric generating systems in the region have been modeled. With each iteration of the process, the energy output of the solar electric generation system being evaluated is summed with that of those that have already been evaluated. The result of this process is a one-week prediction, on an hourly basis, of the total energy production of the solar electric generating systems distributed over the region being evaluated.

Figure 3B:
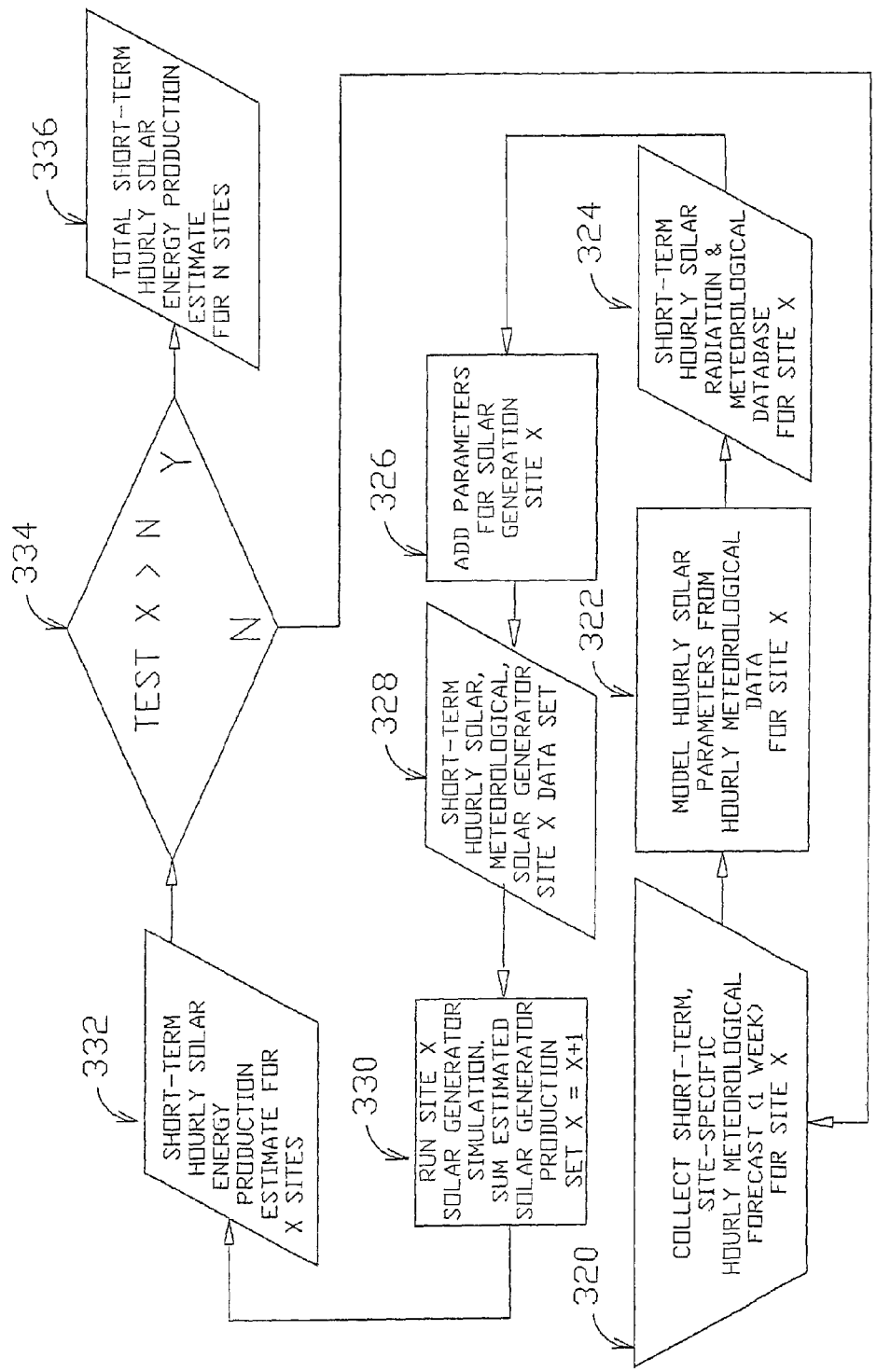
FIG. 3B shows a flow-diagram of the process of FIG. 3A.

FIG. 3B shows a flow diagram of the process of FIG. 3A for predicting the electrical energy produced by a set of N solar electric generating systems, distributed over a region, on an hourly basis, one week in advance. The process can be implemented through the following steps:

1. For a set of N solar generation systems distributed over a region, set a variable X=1.
2. Collect one-week weather forecast data 320 for a geographic region of interest from a weather service provider, such as the National Weather Service or a commercial alternative, for the sub-region or grid cell, closest to the solar generation system corresponding to the location of site X. Convert the weather forecast data into a format required for use as inputs in an irradiance model 322. The irradiance model 322 can be MRM™ (Meteorological Radiation Model) or any other appropriate irradiance model that produces estimates of solar irradiance parameters. The solar irradiance parameters can include global horizontal (GH), diffuse horizontal (DH), and direct normal (DN) irradiance from the meteorological parameters.
3. Insert the regional forecast meteorological data 320 into the selected irradiance model 322 to estimate irradiance levels, expressed in terms of GH, DH, and DN for the hours and the region in question. Produce a site X combined database 324 for each hour of the forecast week of irradiance parameters and meteorological data. The site X combined database 324 is used in a solar generator simulation software program 330, such as PV Design Pro™.
4. Add the physical parameters 326 unique to site X. The parameters 326 can include system size, orientation angles, equipment types, electrical characteristics, shading obstructions, latitude, longitude, elevation, and other features. The physical parameters 326 are added to the site X combined database 324 to create a combined meteorological, irradiance and solar generator database 328 needed to run the solar generator simulation software program 330.
5. Run the simulation program 300 and output the electrical system production for system X. Add this to the total for solar generation systems 1 though X−1 and input to database 332. Database 332 includes the electrical output for each hour of the forecast period for the systems 1 through X−1. Next, increment X.
6. Test 334 if X is greater that N. If X is less or equal to N, return to step 1 and repeat the assessment the next site X. If X is greater than N, then terminate the process. Database 332 becomes the final output database 336 which includes, on an hourly basis, a one week forecast of the total electrical energy production of N solar generation sites, distributed across the region of interest.

FIG. 4A is another embodiment of the invention which provides a system 400 for predicting the net energy for facilities in a region being evaluated, exported to or imported from the region's electrical grid. The system 400 includes the components of system 300 of FIG. 3A and a load forecasting module 410. The forecasting module 410 adds the load for each facility which hosts a solar generation system, to the iterative process estimating the hourly electrical energy production for a set of solar generating system distributed over the region. With each iteration of the process, the net electrical energy production or consumption is summed with that of those that have already been evaluated. The result of this process is a one-week prediction, on an hourly basis, of the net energy produced or consumed, by facilities that host solar electric generating systems distributed over the region being evaluated.

Figure 4B:
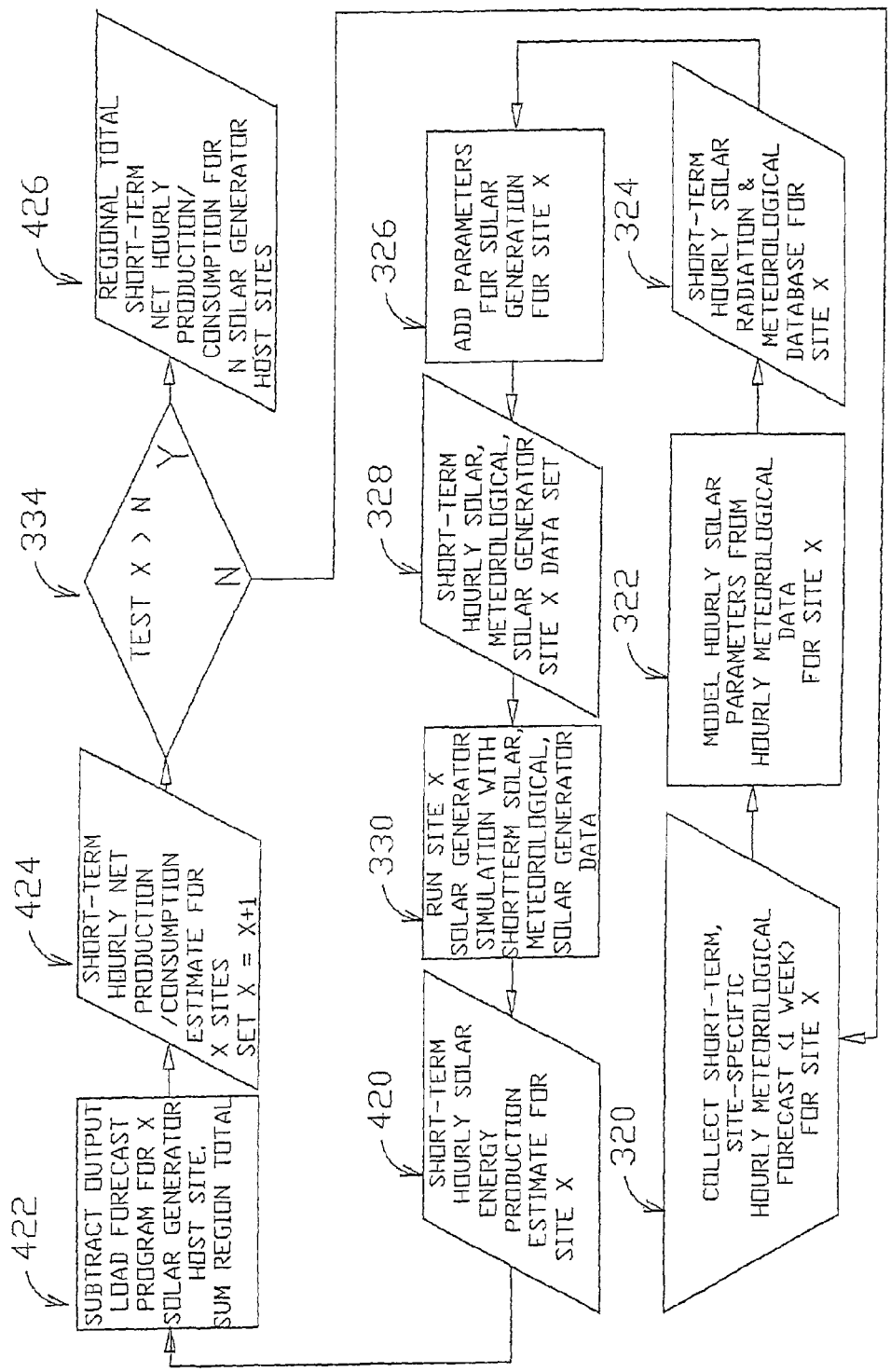
FIG. 4B shows a flow-diagram of the process of FIG. 4A.

FIG. 4B shows a flow diagram of the process of FIG. 4A for predicting on an hourly basis, one week in advance, the net electrical energy imported or exported from an electrical grid, by a set of N facilities which are connected to the electrical grid, and that have solar generation systems on the facility side of the point of common connection to the grid. The process can be implemented through the following steps:

1. For a set of N facilities which are connected to an electrical grid, and that have solar generation systems on their side of the point of common connection, and are distributed over a region, set a variable X=1.
2. Collect one-week weather forecast data 320 for a geographic region of interest from a weather service provider, such as the National Weather Service or a commercial alternative, for the sub-region or grid cell, closest to the solar generation system corresponding to the location of site X. Convert the weather forecast data into a format required for use as inputs in an irradiance model 322. The irradiance model 322 can be MRM™ (Meteorological Radiation Model) or any other appropriate irradiance model that produces estimates of solar irradiance parameters. The solar irradiance parameters can include global horizontal (GH), diffuse horizontal (DH), and direct normal (DN) irradiance from the meteorological parameters.
3. Insert the regional forecast meteorological data 320 into the selected irradiance model 322 to estimate irradiance levels, expressed in terms of GH, DH, and DN for the hours and the region in question. Produce a site X combined database 324 for each hour of the forecast week of irradiance parameters and meteorological data. The site X combined database 324 is used in a solar generator simulation software program 330, such as PV Design Pro™.
4. Add the physical parameters 326 unique to site X. The parameters 326 can include system size, orientation angles, equipment types, electrical characteristics, shading obstructions, latitude, longitude, elevation, and other features. The physical parameters 326 are added to the site X combined database 324 to create a combined meteorological, irradiance and solar generator database 328 needed to run the solar generator simulation software program 330.
5. Run the solar generator simulation program 330 using the site X combined database 324 and output the electrical system energy production for system X to produce a short-term energy production database 420. The short-term energy production database 420 includes the electrical output for each hour of the forecast period for system X.
6. Run an energy demand forecasting simulation program 422, such as CEDMS (Commercial Energy Demand Model System) or REDMS (Residential Energy Demand Model System) for the facility that includes the solar generating system X. These models yield a demand profile for the facility being considered that represents the electricity demand that these customers would present in the absence of any customer-sited generation.
7. Subtract the output of the load forecasting simulation 422 from the output of the short-term energy production database 420, for site X, to produce a one-week forecast, on an hourly basis, of the net electrical energy imported or exported from the grid, for site X. Sum this value with the previous totals to create a net production database 424 for X sites. Next, increment X.

8. Test 334 if X is greater that N. If X is less or equal to N, return to step 1 above and repeat the assessment the next site X. If X is greater than N, then terminate the process. Database 424 becomes the final output database 426 which includes on an hourly basis, a one week forecast of the net electrical energy imported or exported from the grid, from a set of N facilities with solar generation, distributed across the region of interest.

Figure 5A:
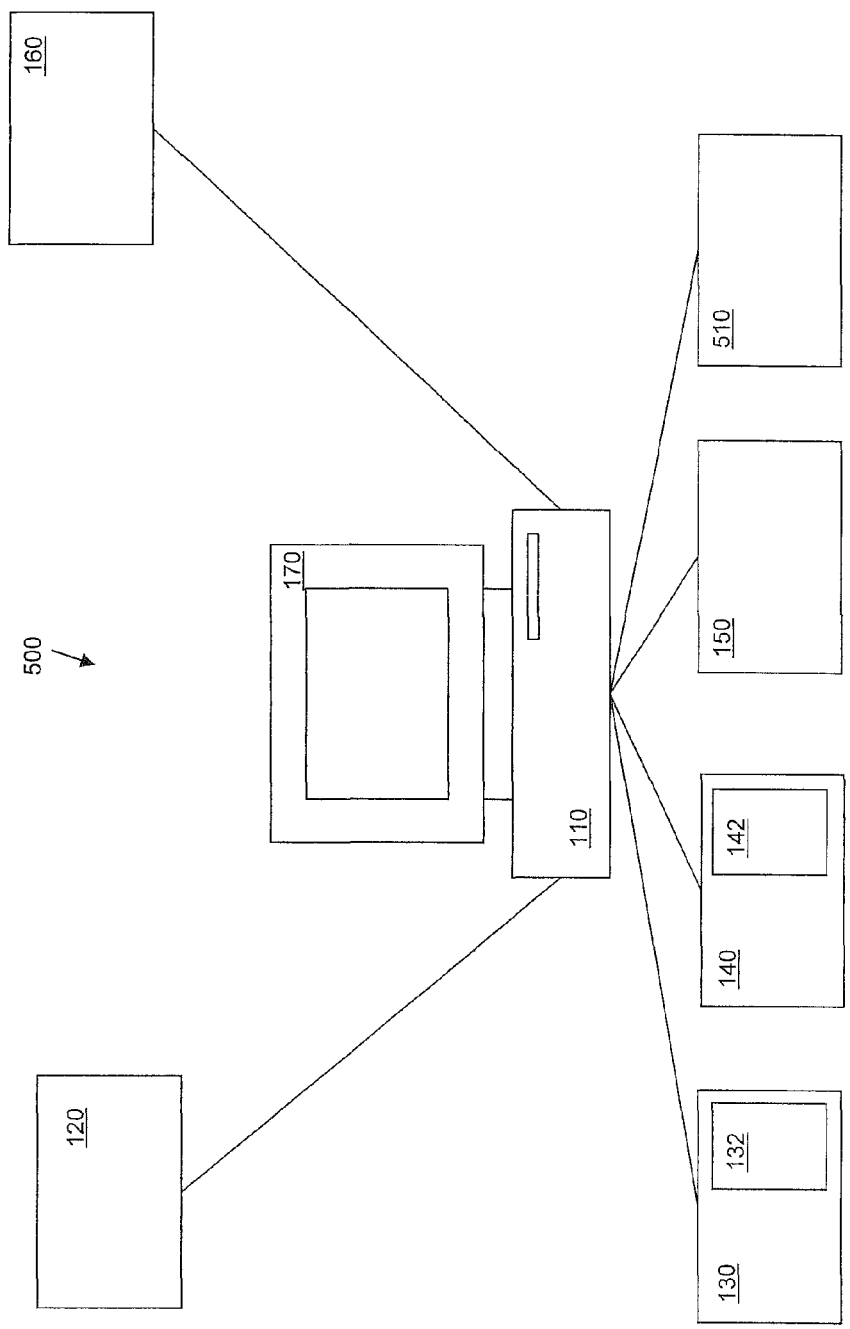
FIG. 5A shows a system diagram for predicting the solar energy incident on a surface, one week in advance, on an hourly basis.

FIG. 5A is another embodiment of the invention which provides a system 500 for predicting on an hourly basis, one week in advance, the incident solar power on any surface. The system 500 includes the components of system 100 of FIG. 1A and a surface characterization module 510. The surface characterization module 510 includes a description of the size, orientation and environmental setting of the surface being assessed. The completed database is then used as input to a model, in the form of a software program, that simulates solar power hitting surfaces on the earth. The output of the process is an hourly estimate, for the week of the original weather forecast, of the solar power hitting the surface being modeled.

Figure 5B:
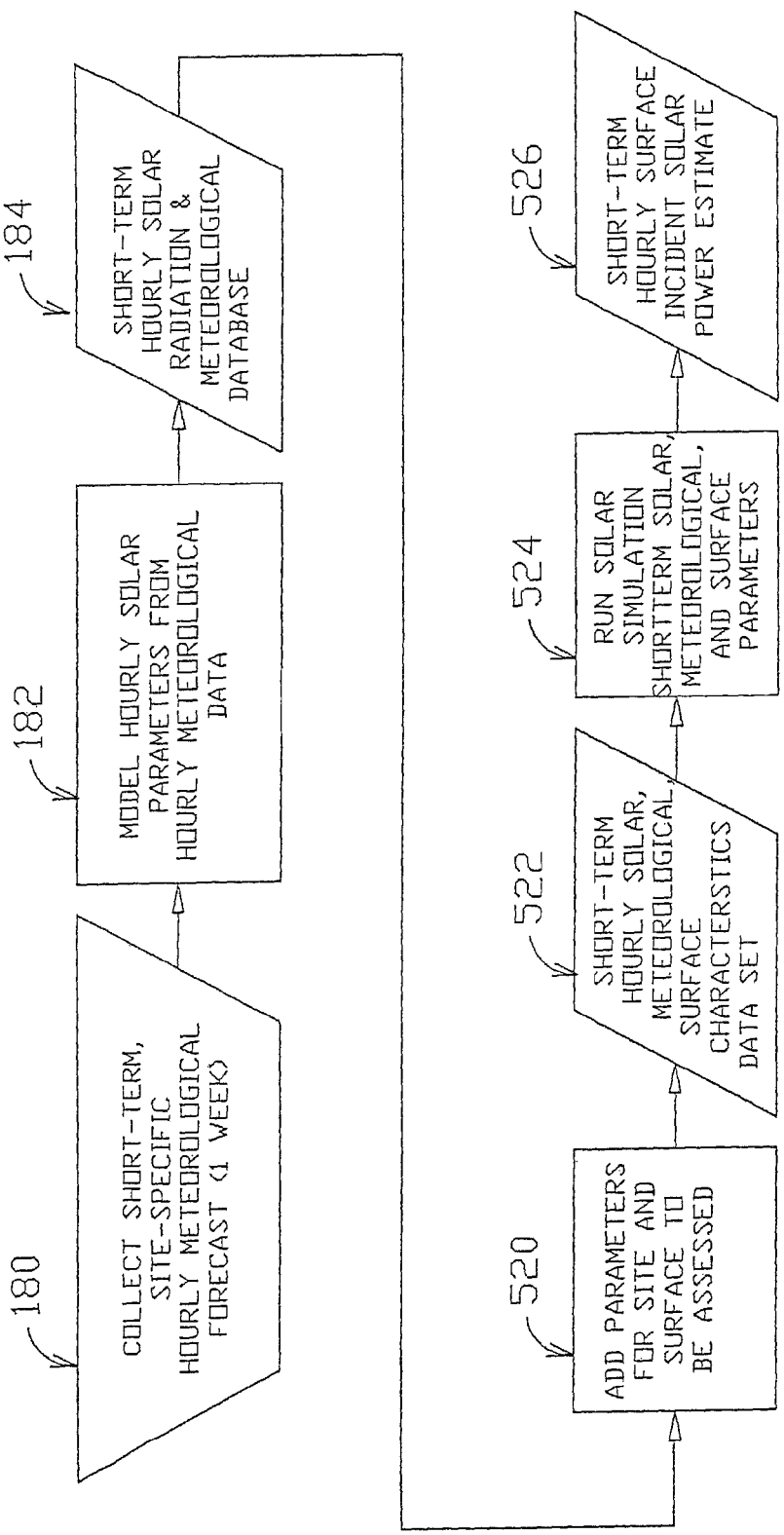
FIG. 5B shows a flow-diagram of the process of FIG. 5A.

FIG. 5B shows a flow diagram of the process of FIG. 5A for predicting the solar power incident on a surface, on an hourly basis, one week in advance. The process can be implemented through the following steps:

1. Collect one-week weather forecast data 180 for a geographic region of interest from a weather service provider, such as the National Weather Service or a commercial alternative. Convert the weather forecast data into a format required for use as inputs in an irradiance model 182. The irradiance model 182 can be MRM™ (Meteorological Radiation Model) or any other appropriate irradiance model that produces estimates of solar irradiance parameters. The solar irradiance parameters can include global horizontal (GH), diffuse horizontal (DH), and direct normal (DN) irradiance from the meteorological parameters.
2. Insert the regional forecast meteorological data 180 into the selected irradiance model 182 to estimate irradiance levels, expressed in terms of GH, DH, and DN for the hours and the region in question. Produce a combined database 184 for each hour of the forecast week of irradiance parameters and meteorological data. The combined database 184 is used in a solar simulation software program 524, such as PV Design Pro™.
3. Add the physical parameters 520 for a target surface to be accessed. The surface parameters can include surface size, orientation angles, shading obstructions, latitude, longitude, elevation, and other features. The physical parameters 520 are added to the combined database 184 to create a combined meteorological, irradiance and target surface database 522 needed to run the solar generator simulation software program 524.
4. Run the simulation program 524 and output the incident solar power hitting the surface being modeled. This result is a database 526 containing the solar power incident on the target surface, for each hour of the forecast period.

Figure 6:
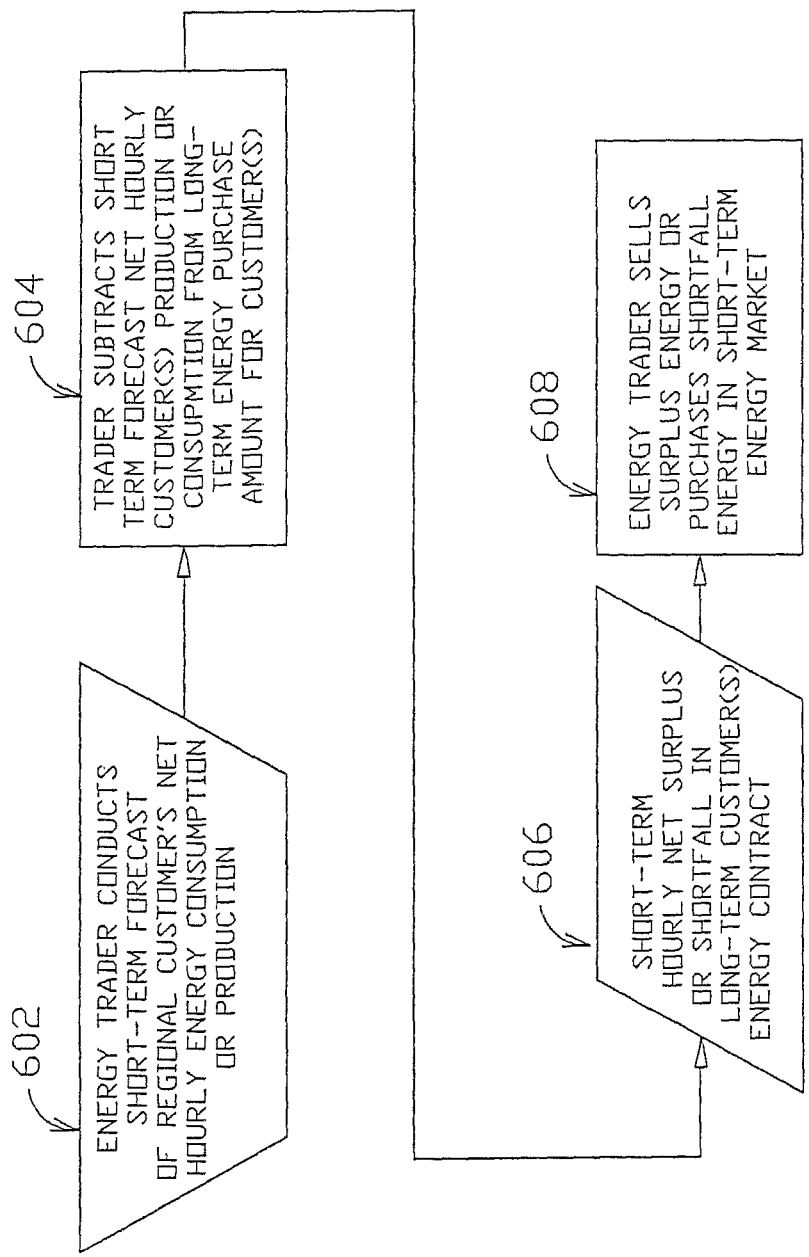
FIG. 6 shows a flow-diagram of a method to anticipate the short-term demand for customers who have solar generation capability within their facilities.

FIG. 6 shows a flow diagram of another embodiment of the invention which provides a method to anticipate the short-term demand of an energy trader's customers, some of whom have solar generation capability within their facilities, for energy traders that have long-term energy contract obligations to serve loads. The method adjusts the trader's short-term energy purchases or sales, whether in a day-ahead market or a spot market. The energy trader uses the process to estimate the net hourly energy production or consumption of customers in the time period defined by the short-term market. This estimate is subtracted from the long-term energy contract amounts which the trader has purchased to meet load obligations during the hours in question in the period defined by the short-term markets. The difference between the forecast hourly estimated demand (net production or consumption) and the energy amount that has been purchased under long-term agreements, can be either sold as surplus or purchased to fill an anticipate shortfall. The process can be implemented through the following steps:

1. A net energy 602 is calculated by an energy trader, using the principals as described in FIGS. 4A and 4B. The net energy, imported or exported from a set of facilities with which the trader has a contractual obligation to supply a load, some of which have solar generation systems on the facility side of the point of common connection to the electrical grid, is calculated, on an hourly basis, one week in advance.
2. A resulting energy 602 is calculated by the trader. The trader subtracts the short-term estimated net energy 602 from the amount of electrical energy purchased in long-term contracts for the supply facilities 604. The calculation is done on an hourly basis, one week in advance, within a geographic region.
3. A resulting difference 606 is an amount of energy that the trader must purchase, or can offer for sale, in a short-term market. The net purchase or sales 608 in the short-term market is the difference between the trader's long-term contracted energy purchases and the short-term energy purchases or sales needed to meet his anticipated demand or load obligation.

Figure 7:
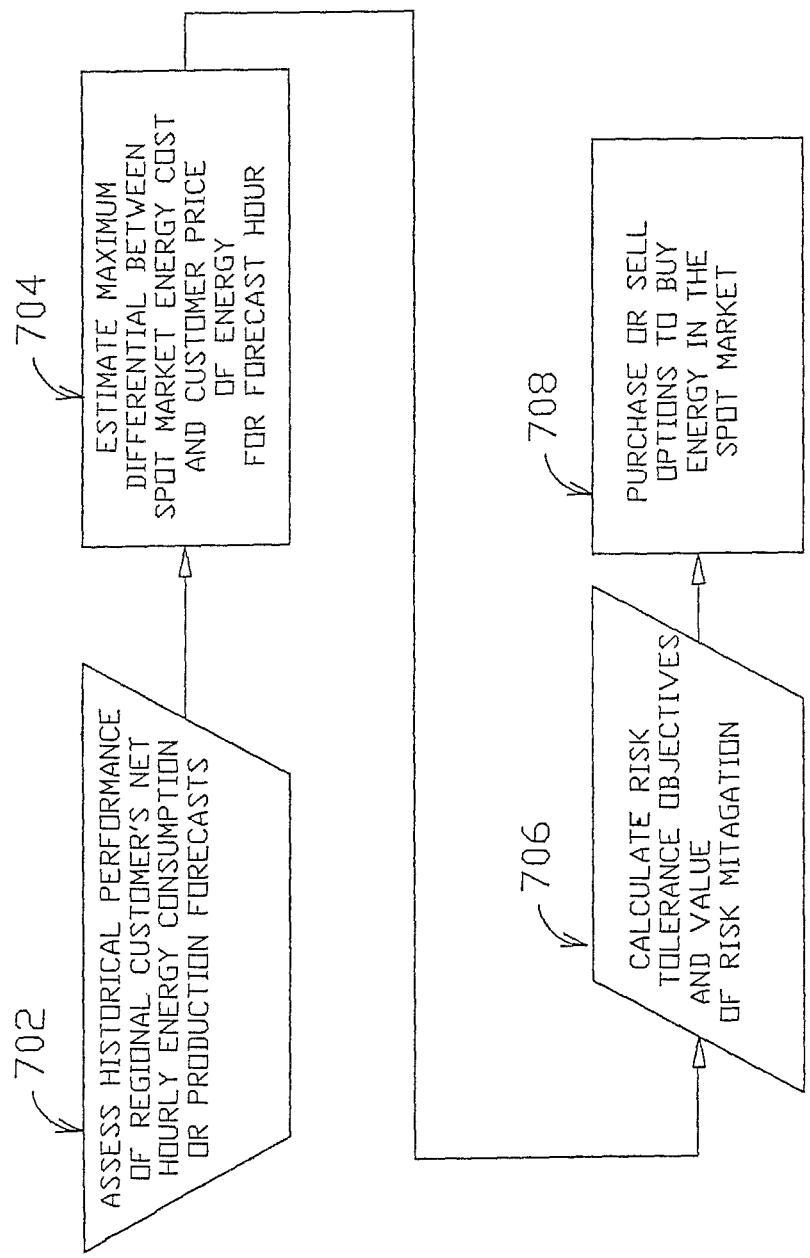
FIG. 7 shows a flow-diagram for a method for insuring or hedging energy sales or purchases in the day-ahead, short-term market against shortfalls in a spot market.

FIG. 7 shows a flow diagram of another embodiment of the invention which provides a method for insuring or hedging energy sales or purchases in a one day-ahead, short-term market against shortfalls in a spot market. An hourly short-term energy futures market is defined which consists of options to buy or sell blocks of energy in the spot market, at pre-agreed prices. Buyers and sellers of options in this market will use the performance history of the short-term net energy forecasts for regions with facilities, some of which have solar generation capability within their facilities, to assess the risk associated with purchases or sales of energy that are based upon those forecasts. Energy traders in the short-term market buy energy because of an anticipated shortfall or sell energy because of an anticipated surplus in their long-term contracts. Energy traders also purchase options to mitigate their exposure for shortfalls in the spot markets. Energy traders purchase options based upon their assessment of the accuracy of the forecasting technology, in combination with their tolerance for risk. A greater liquidity is created in the market and permits a wider range of market participants. The process can be implemented through the following steps:

1. In a deregulated electrical energy market that has facilities, some of which have solar generation systems on the facility side of the point of common connection to the electrical grid, a petition is filed with the regulatory body that oversees the market, requesting the creation of a product category for a one-hour electrical energy future or option (if this product does not already exist).
2. Qualifications for traders in one-hour energy futures are proposed to the regulatory body that oversees the market (if these qualifications do not already exist).
3. A venue and timetable for trading in one-hour energy futures are proposed to the regulatory body that oversees the market (if a venue and timetable does not already exist).

4. Once the regulatory body that oversees the market has approved a one-hour electrical energy future or option product, credentials for traders in one-hour electrical energy futures or options, and a venue and time table for trading one-hour electrical energy futures or options, options traders and energy traders will assess the historical accuracy of estimates made by energy traders of the purchases and sales of energy needed in the short-term market, such as a day-ahead market, that makes up the shortfall or surplus from their long-term contracts.

5. A historical performance or accuracy 702 of regional net energy forecasts is determined using the principals as described with reference to FIGS. 4A and 4B. The determination is for markets that have facilities, some of which have solar generation systems on the facility side of the point of common connection to the electrical grid.

6. An estimation 704 of the difference between the maximum cost of energy in a spot market and an energy trader's price of energy for each hour during a forward spot market is calculated.

7. A risk determination 706 is made by the energy trader. The energy trader calculates a tolerance for risk and the value of mitigating the risk.

8. The value of options 708 is determined by energy traders and options traders. Energy traders and options traders purchase and sell options to buy energy, at a pre-agreed price, in a spot market, during trading in the preceding day ahead market.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for hedging energy sales or purchases in a a short-term future or day-ahead market against shortfalls in a spot market, comprising:
    determining on a computer processor an historical accuracy of a regional net energy forecasting methodology for a facility or facilities which have solar energy generating systems in a geographical region;
    estimating a difference between the maximum cost of energy in a future spot market and an energy trader's price of energy for each hour during a current day-ahead market;
    determining a risk factor associated with energy sales and purchases from the determined historical performance and the estimated difference between the maximum cost of energy and the energy trader's price of energy; and
    purchasing options to buy or sell energy based on the determined risk.

2. A method for hedging energy sales or purchases in a short-term future or day-ahead market, the method comprising:
    determining on a computer processor an historical accuracy of a regional net energy forecasting methodology for a facility or facilities which have solar energy generating systems in a geographical region;
    estimating a difference between the maximum cost of energy in a spot market and an energy trader's minimum price of energy for each hour bid in the short-term future or day-ahead market;
    determining a risk factor associated with energy sales or purchases from the determined historical performance and the estimated difference; and
    purchasing or selling options to buy energy at the previous day's day-ahead market price based on the determined risk factor.

* * * * *

UNITED STATES PATENT AND TRADEMARK OFFICE
CERTIFICATE OF CORRECTION

PATENT NO. : 8,527,398 B2
APPLICATION NO. : 13/619627
DATED : September 3, 2013
INVENTOR(S) : James M. Bing Page 1 of 1

It is certified that error appears in the above-identified patent and that said Letters Patent is hereby corrected as shown below:

In the Claims:

In Column 12, Claim 1, line 2, delete "a"

Signed and Sealed this
Twelfth Day of November, 2013

Teresa Stanek Rea
*Deputy Director of the United States Patent and Trademark Office*